July 16, 1963  D. C. SCHLUDERBERG  3,098,023
NUCLEAR REACTOR CONTAINMENT SYSTEM
Filed Sept. 15, 1958
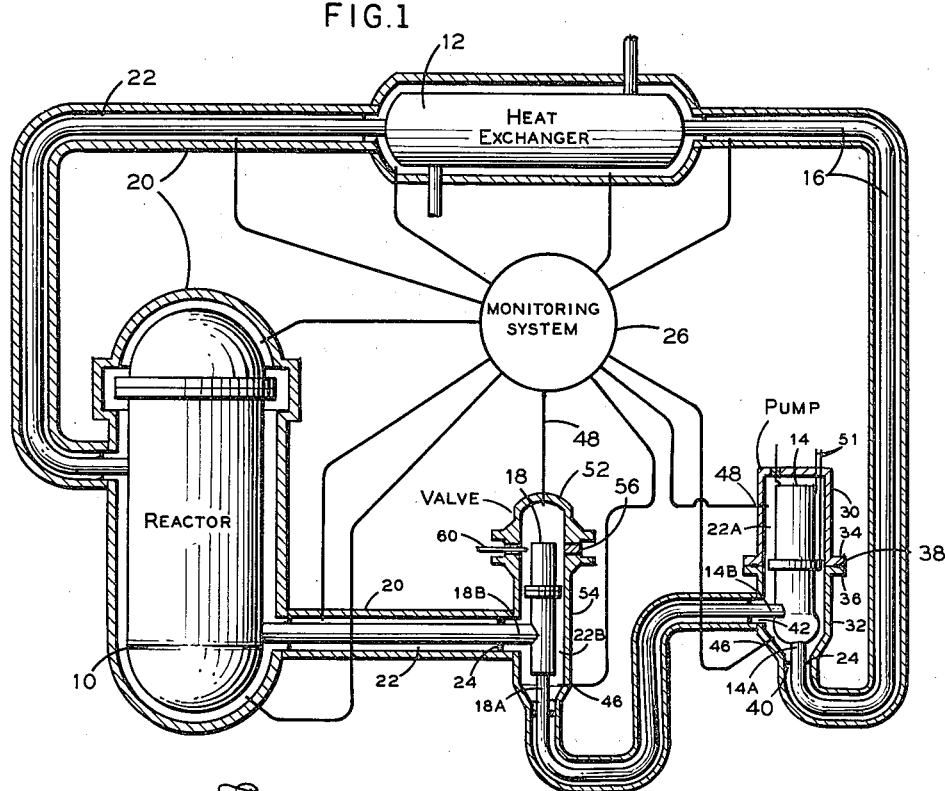
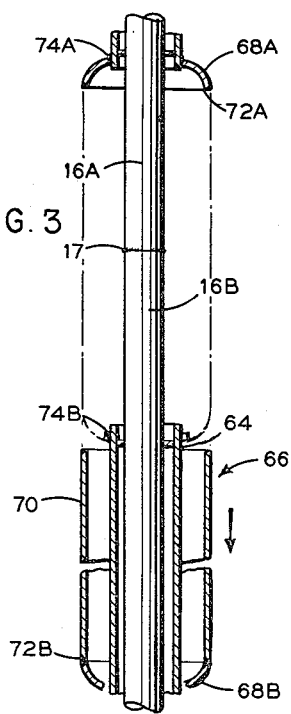
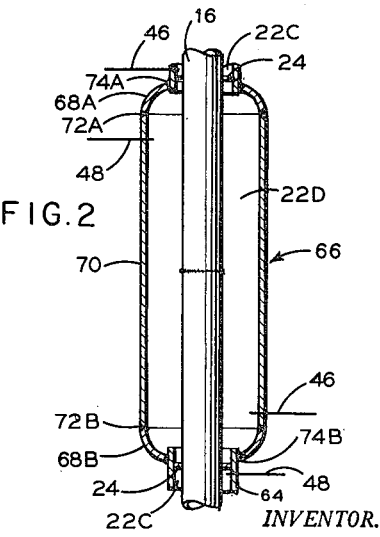
INVENTOR.
Donald C. Schluderberg
BY
ATTORNEY United States Patent Office 3,098,023
Patented July 16, 1963

3,098,023
NUCLEAR REACTOR CONTAINMENT SYSTEM
Donald C. Schluderberg, Lynchburg, Va., assignor to The Babcock & Wilcox Company, New York, N.Y., a corporation of New Jersey
Filed Sept. 15, 1958, Ser. No. 761,074
5 Claims. (Cl. 204—193.2)

This invention relates in general to a nuclear reactor system and, more particularly, to a fluid-tight containment for the components of the reactor primary coolant system.

In nuclear reactor systems, due to the inherently dangerous nature of the processes involved, it is of the utmost importance to provide for their continuous safe operation. Safe operation requires not only protection for the surrounding communities, but also for the system's operating personnel and the components of the system itself.

It is general practice to provide an overall containment usually in the form of a sphere for a nuclear reactor system. The sphere may be subdivided to provide separate spaces for the nuclear system, its instrumentation and control equipment, and facilities for the operating personnel. The purpose of this overall containment is to prevent any explosion or leakage of radioactive material within the sphere from affecting the surrounding communities. This overall containment, however, does not provide optimum provisions for maintenance of the reactor system components or for safety of reactor operating personnel in the sphere.

The nuclear reactor primary coolant system comprises, basically, a reactor vessel, wherein the nuclear chain reaction occurs, a separate device to convert the heat developed in the chain reaction into a usable form, such as the transfer of heat to a thermodynamic fluid, a primary coolant pump, connecting piping and valves. A primary coolant fluid is circulated by means of the primary coolant pump in a closed circuit through the system. The primary coolant fluid picks up heat within the reactor vessel and gives it up in the heat converter device. The ability to maintain the continuous circulation of the primary coolant is very important for the economical performance of the nuclear reactor system. The problem arises, however, in providing for adequate inspection and maintenance of the components which make up the reactor primary coolant system. When the separate compartments are arranged to be contained in a containment sphere, their arrangement is not suitable for inspection and maintenance functions. These functions become increasingly difficult as system radioactivity levels rise, especially if the plant is not arranged to facilitate inspection and maintenance. The problem of adequate inspection is further complicated because the expected safe service life of the components is generally unknown and unpredictable. This situation arises because nuclear plants often involve new combinations of materials and coolants for which there is insufficient data available to predict service life of the materials and components used.

Nuclear reactor systems, to which the present invention applies, may be divided into heterogeneous and homogeneous reactor systems. Heterogeneous reactors, where the fissionable material and the moderator are arranged as discrete bodies and usually in a regular pattern, include pressurized water reactors, where the moderator-coolant is pressurized to avoid boiling and boiling-water reactors where part of the moderator-coolant is converted to steam in passing through the reactor vessel. Pressurized water reactors require a heat exchanger to convert the heat removed from the reactor to a usable form while in boiling water reactors the steam generated within the reactor vessel may go directly to a point of use. Homogeneous reactors combine the fuel, fertile material, coolant and moderator, if any, in a solution or slurry. An example of this type of reactor is a liquid metal fuel reactor. In homogeneous reactors a heat exchanger is required to transfer the heat derived from the chain reaction to a thermodynamic fluid.

A major difficulty encountered in homogeneous reactor systems is the possibility of leakage from the various components and piping in the primary system with the resultant hazard of serious radioactive contamination of portions within the containment shield. The ability to avoid and control this hazard will reduce maintenance costs and minimize the consequence of unknown component service life.

In addition to leakage another difficulty encountered is brittle failure in reactor systems where the primary coolant is circulated under pressure as in aqueous homogeneous or pressurized water reactors. A brittle failure in such systems will result in a missile problem with fragments developed from the brittle failure being propelled about the compartment containing the reactor system. These fragments are liable to pierce the entire containment system and also cause extensive damage to the remaining components unless adequate protection is provided.

Therefore, it is the purpose of the present invention to localize the effect of leaks or brittle failures in a reactor primary coolant system by providing a closely fitting, fluid tight pressure shell completely enclosing the components forming the closed circuit through which the primary coolant flows. The pressure shell is a continuous integral structure having a configuration generally conforming to the shape of the enclosed components and forming therewith a narrow annular flow space.

In addition, the present invention provides means for circulating a fluid through the flow space, between the components forming a closed circuit for the primary coolant and the pressure shell, in conjunction with means to monitor the fluid to detect leaks in the components.

The present invention provides means for locating leaks in the system components by dividing the flow space into individual compartments, with each compartment connected to a monitoring system, the monitoring system is of a type well known in the art. Then, in the event a leak develops the monitoring system will allow identification of the defective component. Additionally, the pressure shell is constructed so that it may be removed easily and individual components replaced without necessitating the removal of more than the defective component. The pressure shell enveloping the connecting piping is constructed so that individual sections of defective piping with their containment may be removed and replaced by a simple operation without affecting the adjoining piping and maintaining the integrity of the pressure shell.

The various features of novelty which characterize the invention are pointed out with particularity in the claims annexed to and forming a part of this specification. For a better understanding of the invention, its operating advantages and specific objects attained by its use, reference should be had to the accompanying drawings and descriptive matter in which I have illustrated and described a preferred embodiment of my invention.

Of the drawings:

FIG. 1 is a schematic diagram of the present invention showing in section the pressure shell, which encloses the components of a reactor primary coolant system;

FIG. 2 is a sectional view of a portion of the pressure shell showing the connecting piping, which is joined together by welded joints, contained therein; and FIG. 3 is a view similar to FIG. 2 showing the section of the pressure shell which envelopes the joint of the connecting piping detached and moved away from the joint.

Referring to the drawings, FIG. 1 shows a nuclear reactor system wherein the heat developed within the reactor is transported by the primary coolant fluid to a heat exchanger wherein the heat is transferred to another fluid. The arrangement shown is typical of an externally cooled reactor system, such as an aqueous homogeneous, pressurized water or a liquid-metal fuel reactor.

The nuclear reactor system components shown in FIG. 1 form a closed circuit through which the primary coolant flows. The components comprise a reactor 10, a separate heat exchange unit 12, having suitable inlet and outlet connections thereto, a primary coolant pump 14, connecting piping 16 and a valve 18. A close fitting, fluid-tight, pressure shell 20 completely contains these components and the shell forms an integrally continuous structure whose configuration generally follows the shape of the contained reactor system components. A narrow annular flow space 22 is formed between the pressure shell 20 and the individual components which it encloses. Diaphragms 24 are disposed transversely of the flow space 22 and are attached to both the pressure shell 20 and to the component contained therein. The diaphragms 24 divide the flow space 22 into separate, fluid-tight compartments (hereinafter designated by the reference numerals 22 and a letter, i.e. 22A). The diaphragms are capable of withstanding either full primary system or monitoring system pressure whichever is greater. A monitoring system 26 is in communication with each of the compartments formed in the flow space 22 to detect and signal the presence of any leakage from the individual components contained therein.

The pressure shell 20 is shown in section containing a primary coolant pump 14 having inlet and outlet connections 14A, 14B contained therein. The pressure shell 20 enclosing the pump 14 is divided into an upper pump section 30 and a lower pump section 32. The upper pump section 30 and the lower pump section 32 have matching flanges 34, 36 which are provided to form in combination with a gasket 38, a bolt connected, fluid-tight pressure closure. An inlet opening 40 and an outlet opening 42 are located in the lower pump section 32 to provide access for the connecting piping 16 to the pump inlet and outlet connections 14A, 14B. The upper and lower pump sections 30, 32 are closely spaced from the pump 14 and form in conjunction with a pair of annular shaped diaphragms 24 a flow space compartment 22A. The diaphragms 24 are attached to and situated generally perpendicular to the pressure shell 20 and the pump 14 at the inlet and outlet sections 40, 42 and thereby provide a fluid-tight seal for the flow space compartment 22A. Monitoring fluid inlet and outlet connections 46, 48 are provided in the upper and lower pump sections 30, 32 to allow the passage of a monitoring fluid through the flow space compartment 22A. The monitoring fluid, after it circulates through the flow space compartment 22A is passed through the monitoring system 26 to determine the presence of any leakage from the pumps 14. Power connections 51 are provided through the pressure shell 20 to the pump to provide for its remote operation.

The valve 18 is used to cut off the flow through the primary coolant system. In the usual nuclear reactor system there would be multiple primary coolant loops connected to a single reactor. In such cases there would be two valves 18 in each primary coolant loop so that the loop could be isolated from the remainder of the system whenever it was necessary. The valve 18, with valve inlet and outlet connections 18A, 18B, is shown within the pressure shell 20. The portion of the pressure shell which contains the valve 18 is composed of a cover section 52 and a body section 54. That section of the pressure shell 20 which encloses the connecting piping 16 is integrally joined to the body section 54 at the location of the valve inlet and outlet connections 18A, 18B. Cover section 52 and body section 54 are flanged to provide for a bolted closure. An annular ring 56 is disposed between the cover section 52 and the body section 54. The annular ring 56 combines with the flange connection to provide a fluid-tight pressure closure. A conduit 60 passes through the annular ring 56 to provide a source of power for the remote operation of the valve 18.

The pressure shell 20 is closely spaced from the valve 18 and forms in combination with a pair of annular shaped diaphragms 24 a flow space compartment 22B about the valve. The annular shaped diaphragms 24 are disposed transversely of the flow space compartment 22B at the inlet and outlet connections 18A, 18B. The diaphragms 24 are connected to the inner surface of the pressure shell 20 and to the opposing surfaces of the valve inlet and outlet connections 18A, 18B to provide a fluid-tight seal for the flow space compartment 22B. Monitoring fluid inlet and outlet connections 46, 48 are provided in the pressure shell 20 which encloses the valve 18 to allow the passage of a monitoring fluid through the flow space compartment 22B. The monitoring fluid after its passage through the flow space compartment 22B is passed through the monitoring system 26 to determine the presence of any leakage from the valve 18.

A typical portion of connecting piping 16 having welded joints is shown in FIG. 2. That part of the pressure shell 20 which contains the connecting piping 16 is made up of straight piping sections 64 and joint sections 66. Each joint section 66 has an interior diameter of sufficient size so that it will telescope over the adjoining straight piping sections 64. The joint sections 66 are welded to the straight piping section 64 to form a continuous structure. The pressure shell sections 64, 66 are closely spaced from the connecting piping and form in combination with annular shaped diaphragms 24 a plurality of separate flow space compartments 22C, 22D having annular shaped cross-section. The diaphragms 24 are arranged transversely of the flow space compartments 22C, 22D and are attached to the connecting piping 16 and the pressure shell sections 64 to provide fluid-tight seals between the flow space compartments 22C, 22D. Monitoring fluid inlet and outlet connections 46, 48 are provided in the pressure shell sections which contain the connecting piping 16 to admit the passage of a monitoring fluid through each of the flow space compartments 22C, 22D. The monitoring fluid after it passes through the flow space compartments 22C, 22D is processed through the monitoring system 26 to determine the presence of any leakage from the piping 16.

In the event a section of the connecting piping 16 requires replacement, this operation can be remotely performed. In FIG. 3 a part of this operation is illustrated in which a portion of a joint section 66 of the pressure shell 20 is shown about the adjoining straight section 64 of the pressure shell. The original position of the disconnected portion is shown in phantom. For purposes of explanation the connecting pipe sections shown are marked 16A, 16B and the weld joining them is marked 17. The joint section 66 of the pressure shell 20 is made up of two cup-shaped open ended pieces 68A, 68B and a cylindrically shaped center sleeve 70. The larger open end of the cup-shaped pieces 68A, 68B has a diameter equal to the diameter of the sleeve 70 while the smaller open end has a diameter sufficiently large to permit a sliding fit over the straight piping section 64 of the pressure shell 20. The cup-shaped pieces 68A, 68B are integrally joined at their larger ends to the sleeve 70 by means of welds 72A, 72B and at their smaller ends to the straight piping sections 64 by means of welds 74A, 74B.

If it is assumed that the monitoring system indicates that there is a leak in the section of connecting piping 16B the defective section can be remotely removed and replaced in the following manner:

(1) The welds 72A and 74B are cut to separate the sleeve 70 and the cup-shaped piece 68B from the remainder of the pressure shell 20.

(2) Next, the sleeve 70 and the cup-shaped piece 68B are slid telescope fashion over the straight piping section 64 which encloses the defective section of connecting piping 16B thereby uncovering the joint between the connecting piping sections 16A, 16B.

(3) The joint section 66 at the opposite end of the defective section of connecting piping 16B also is cut in the same manner as set forth in steps 1 and 2 to uncover the joint at that end of the section of connecting piping 16B.

(4) The weld 17 between the connecting piping sections 16A, 16B is cut as is the similar weld at the opposite end of the defective connecting piping section 16B.

(5) The defective piping section 16B is removed and replaced by a new section of connecting piping 16B contained within a straight piping section 64 of the pressure shell 20 with the combination sleeve 70 and cup-shaped piece 68B section for each joint slidably fitted about the straight piping section 64.

(6) The new connecting piping section 16B is joined to the connecting piping section 16A by means of the weld 17 and it also is welded to the adjoining connecting piping at its opposite end.

(7) The combination sleeve 70 and cup-shaped pieces 68B sections are slid over the straight piping section 64 to their position about the joints between the new connecting piping section 16B and the adjoining connecting piping sections.

(8) The welds 72A, 74B are made securing the combination sleeves 70 and the cup-shaped piece 68B section in position and resealing the pressure shell 20 about the connecting piping 16.

All the steps set forth above are carried out by remote operation so that defective piping sections are removed and replaced without exposing operating personnel to the hazards of radioactivity. This method of remote removal and replacement is applicable not only to welded connecting piping but also to connecting piping joined by bolted flanges and other types of pipe connections.

Other defective reactor primary coolant system components also may be removed by remote operation similar to the general procedure for removing defective connecting piping. As shown in FIG. 1 each component is contained within an individual flow space compartment which is monitored to indicate any leakage from the component. In the event the internals of a component need to be replaced, the pressure shell is provided with bolted flange cover sections which may be remotely removed for access to the defective component. By remote operation the component internals can be removed and replaced and the pressure shell restored.

Therefore, the present invention provides a containment for the components of a nuclear reactor system through which the primary coolant fluid circulates in a closed circuit. The containment and monitoring system provides means whereby the quantity of radioactivity leaking from the components is minimized and in turn the radioactivity hazard to operating personnel is lessened and the amount of shielding required to protect the operating personnel is reduced. Further, the containment in combination with the monitoring fluid will eliminate the missile problem resulting from brittle failures in the reactor system wherein the coolant circulates under high pressure. The incompressibility and mass of the monitoring liquid will prevent the impartation of high velocities to the fragments resulting from a brittle failure and the viscous drag of the fluid will absorb kinetic energy from the moving fragments. Additionally, the monitoring fluid prevents cutting of the containment by a jet from a pinhole leak in a reactor system where the primary coolant circulates under pressure.

While in accordance with the provisions of the statutes the best form of the invention is illustrated and described, those skilled in the art will understand that changes may be made in the form of the apparatus disclosed without departing from the spirit of the invention covered by the claims and that certain features of my invention may sometimes be used to advantage without a corresponding use of the other features.

I claim:

1. In a nuclear reactor primary coolant system having a closed circuit for the continuous circulation of a primary coolant fluid, said reactor primary coolant system comprising separate components including a reactor and a heat exchanger joined by connecting piping for the flow of primary coolant therethrough, the improvement comprising a closely fitting fluid-tight pressure shell completely enclosing said components and connecting piping which form the closed circuit in a continuous integral structure having a configuration generally conforming to the shape of the contained components and piping and forming therewith a narrow flow space and means for circulating a fluid through said flow space.

2. In a nuclear reactor primary coolant system having a closed circuit for the continuous circulation of a primary coolant fluid, said reactor primary coolant system comprising separate components including a reactor and a heat exchanger joined by connecting piping for the flow of primary coolant therethrough, the improvement comprising a closely fitting fluid-tight pressure shell completely enclosing said components and connecting piping which form the closed circuit in a continuous integral structure having a configuration generally conforming to the shape of the contained components and piping and forming therewith a narrow flow space, means for circulating a fluid through said flow space, and means for monitoring said fluid to detect leaks in said components and connecting piping.

3. In a nuclear reactor primary coolant system having a closed circuit for the continuous circulation of a primary coolant fluid, said reactor primary coolant system comprising separate components including a reactor and a heat exchanger joined by connecting piping for the flow of primary coolant therethrough, the improvement comprising a closely fitting fluid-tight pressure shell enclosing said components and connecting piping which form the closed circuit in a continuous integral structure having a configuration generally conforming to the shape of the components and piping it contains and forming therewith a narrow flow space, diaphragms positioned across said flow space to divide said space into individual fluid-tight compartments, means for circulating a fluid through said flow space compartments, and means for monitoring said fluid to detect leaks in said components and connecting piping.

4. In a nuclear reactor primary coolant system having a closed circuit for the continuous circulation of a primary coolant fluid, said reactor primary coolant system comprising separate components including a reactor and a heat exchanger joined by connecting piping for the flow of primary coolant therethrough, the improvement comprising a closely fitting fluid-tight pressure shell enclosing said components and connecting piping which form the closed circuit in a continuous integral structure having a configuration generally conforming to the shape of the components and piping it contains and forming therewith a narrow annular flow space, said pressure shell enveloping said components having removable cover sections, and the pressure shell enveloping the joints of said connecting piping having short joint sections, said joint sections having an interior diameter of sufficient size to telescope over adjoining sections of the pressure shell containing the connecting piping.

5. In a nuclear reactor primary coolant system having a closed circuit for the continuous circulation of a primary coolant fluid, said reactor primary coolant system comprising separate components including a reactor and a heat exchanger joined by connecting piping for the flow of primary coolant therethrough, the improvement comprising a closely fitting fluid-tight pressure shell enclosing said components and connecting piping which form the closed circuit in a continuous integral structure having a configuration generally conforming to the shape of the components and piping it contains and forming therewith a narrow annular flow space, said pressure shell eveloping said components having removable cover sections, the pressure shell enveloping the joints of said connecting piping having short joint sections, said joint sections having an interior diameter of sufficient size to telescope over adjoining sections of the pressure shell containing the connecting piping, annular diaphragms positioned across said flow space to divide the flow space into individual fluid-tight compartments, means for circulating a fluid through said compartments, and means for monitoring said fluid to detect leaks in said components and connecting piping.

References Cited in the file of this patent

UNITED STATES PATENTS

| | | |
|---|---|---|
| 2,841,545 | Zinn | July 1, 1958 |
| 2,861,033 | Treshow | Nov. 18, 1958 |
| 2,865,827 | Dwyer | Dec. 23, 1958 |
| 2,874,106 | Hammond et al. | Feb. 17, 1959 |

FOREIGN PATENTS

| | | |
|---|---|---|
| 748,264 | Great Britain | Apr. 25, 1956 |

OTHER REFERENCES

Nuclear Power, April 1958, pp. 154–156.